United States Patent
Fu et al.

(10) Patent No.: US 8,832,141 B2
(45) Date of Patent: Sep. 9, 2014

(54) METHOD, DEVICE AND SYSTEM FOR COMBINATION OF RESOURCE AND ADMISSION CONTROL

(75) Inventors: Yan Fu, Shenzhen (CN); Xiaoyu Gong, Shenzhen (CN); Ting Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 648 days.

(21) Appl. No.: 12/683,829

(22) Filed: Jan. 7, 2010

(65) Prior Publication Data

US 2010/0114943 A1    May 6, 2010

Related U.S. Application Data

(63) Continuation of application No. PCT/CN2008/071597, filed on Jul. 9, 2008.

(30) Foreign Application Priority Data

Jul. 10, 2007   (CN) .............................. 200710130614

(51) Int. Cl.

| | |
|---|---|
| G06F 17/30 | (2006.01) |
| H04L 12/911 | (2013.01) |
| H04L 12/54 | (2013.01) |
| H04L 12/24 | (2006.01) |
| H04L 29/06 | (2006.01) |
| H04L 12/923 | (2013.01) |

(52) U.S. Cl.

CPC .......... *H04L 41/0893* (2013.01); *H04L 47/745* (2013.01); *H04L 12/5695* (2013.01); *H04L 47/824* (2013.01); *H04L 63/20* (2013.01); *H04L 47/762* (2013.01); *H04L 47/828* (2013.01)

USPC ........................................................ 707/769

(58) Field of Classification Search

CPC ................................................ G06F 17/30483
USPC ........................................................ 707/769
See application file for complete search history.

(56) References Cited

U.S. PATENT DOCUMENTS

| 7,023,851 B2 | 4/2006 | Chakravorty |
|---|---|---|
| 7,881,317 B2 | 2/2011 | Lin |

(Continued)

FOREIGN PATENT DOCUMENTS

| CN | 1556644 A | 12/2004 |
|---|---|---|
| CN | 1747467 A | 3/2006 |

(Continued)

OTHER PUBLICATIONS

3GPP TS 23.203 V7.3.0: 3rd Generation Partnership Project; Technical Specification Group Services and System Aspects; Policy and charging control architecture (Release 7), Jul. 2006, 72 pages.

(Continued)

*Primary Examiner* — Hosain Alam
*Assistant Examiner* — Johnese Johnson
(74) *Attorney, Agent, or Firm* — Brinks Gilson & Lione

(57) ABSTRACT

A method, a device and a system for combination of resource admission control are provided. The system includes the policy determination combination device and multiple bearer and transmission devices. The combination device combines functions and interfaces of two or multiple kinds of arbitrary policy determination devices in systems of different standards, and has multiple interfaces to be connected with the bearer and transmission devices, and selects the corresponding interface working protocol according to the type of bearer and transmission device. Multiple bearer and transmission devices are connected with the policy determination combination device by different interfaces. By setting policy determination combination device, the combination of policy determination devices is realized with a few changes to the current network. When there are multiple types of bearer and transmission devices in a management domain, the number of the policy determination devices can be efficiently reduced, and the cost of setting up the network and maintenance can be reduced. Also, it is propitious to collaborate and combine different standards and to improve speed of industrialization.

9 Claims, 12 Drawing Sheets

(56) References Cited

U.S. PATENT DOCUMENTS

| | | | |
|---|---|---|---|
| 2007/0143601 A1* | 6/2007 | Arroyo et al. | 713/166 |
| 2008/0046963 A1* | 2/2008 | Grayson et al. | 726/1 |
| 2008/0120700 A1* | 5/2008 | Pandey et al. | 726/4 |
| 2009/0219946 A1 | 9/2009 | Liu et al. | |

FOREIGN PATENT DOCUMENTS

| | | |
|---|---|---|
| CN | 1972246 A | 5/2007 |
| CN | 101163091 A | 4/2008 |
| EP | 1796312 A1 | 6/2007 |
| EP | 1796331 A | 6/2007 |
| WO | 2007045137 A1 | 4/2007 |

OTHER PUBLICATIONS

ETSI ES 282 003 V1.1.1: Telecommunications and Internet converged Services and Protocols for Advanced Networking (TISPAN); Resource and Admission Control Sub-system (RACS); Functional Architecture, Jun. 2006, 41 pages.
ITU-T Q.3301.1: Series Q: Switching and Signalling Signalling requirements and protocols for the NGN-Resource control protocols; Resource control protocol No. 1 (rcp1) Protocol at the interface between service control entities and the Policy Decision Physical Entity (PD-PE) (Rs interface), Mar. 2007, 56 pages.
ITU-T Q.3303.2: Series Q: Switching and Signalling Signalling requirements and protocols for the NGN-Resource control protocols; Resource control protocol No. 3—Protocol at the interface between a Policy Decision Physical Entity (PD-PE) and a Policy Enforcement Physical Entity (PE-PE) (Rw interface): H.248 alternative, Aug. 2007, 56 pages.
ITU-T Q.3304.1: Series Q: Switching and SignallingSignalling requirements and protocols for the NGN-Resource control protocols; Resource Control Protocol No. 4 (rcp4) Protocol at the interface between a Transport Resource Control Physical Entity (TRC-PE) and a Transport Physical Entity (T-PE) (Rc interface): COPS alternative, Oct. 2007, 16 pages.
ITU-T Q.3304.2: Series Q: Switching and Signalling Signalling requirements and protocols for the NGN-Resource control protocols; Resource Control Protocol No. 4 SNMP Profile Protocol at the Rc interface between a Transport Resource Control Physical Entity (TRC-PE) and a Transport Physical Entity (T-PE) (Rc interface), Oct. 2007,10 pages.
ITU-T Q.3302.1: Series Q: Switching and Signalling Signalling requirements and protocols for the NGN-Resource control protocols; Resource control protocol No. 2—Protocol at the Rp interface between transport resource control physical entities, Mar. 2007, 48 pages.
ITU-T Q.3303.1: Series Q: Switching and Signalling Signalling requirements and protocols for the NGN-Resource control protocols; Resource control protocol No. 3—Protocol at the interface between a Policy Decision Physical Entity (PD-PE) and a Policy Enforcement Physical Entity (PE-PE): Cops alternative, Aug. 2007, 66 pages.
ITU-T Y.2111: Series Y: Global Information Infrastructure, Internet Protocol Aspects and Next-Generation Networks Next Generation Networks—Quality of Service and performance; Resource and admission control functions in next generation networks, Sep. 2006, 82 pages.
Office action issued in corresponding Chinese patent application No. 200710130614.1, Aug. 11, 2010, 5 pages.
English Translation of the Written Opinion issued in corresponding PCT application No. PCT/CN2008/071597, Oct. 23, 2008, 6 pages.
Supplementary Search Report and Search Opinion of corresponding European Patent Application No. 08773151.9 , mailed Feb. 1, 2011, 6 pages total.
Rong Zhang et al., A Difference Application Scheme in NGN, Telecommunications Network Technology, May 2007 No. 5, pp. 14-18.
ETSI TS 123 203 V7.3.0: "Digital cellular telecommunications system (Phase 2+); Universal Mobile Telecommunications System (UMTS); Policy and charging control architecture (3GPP TS 23.203 version 7.3.0 Release 7)," Jun. 2007, 74 pages total.
ChoonHee Kim et al.: "Resource Management and Control in NGN Transport," COIN-ACOFT 2007, Jun. 24-27, 2007, Melbourne, Australia, 3 pages total.
Cover page of corresponding granted Chinese Patent No. 101345746B (Application No. 200710130614.1) citing prior art at Item (56), issued Aug. 24, 2011, 1 page only.

* cited by examiner

METHOD, DEVICE AND SYSTEM FOR COMBINATION OF RESOURCE AND ADMISSION CONTROL

CROSS-REFERENCE TO RELATED APPLICATION

The application is a continuation of International Application No. PCT/CN2008/071597, filed on Jul. 9, 2008, which claims priority to Chinese Patent Application No. 200710130614.1, filed on Jul. 10, 2007, both of which are hereby incorporated by reference in their entireties.

FIELD OF THE INVENTION

The present invention relates to communication technologies, and in particular, to a method, device, and system for combination of resource and admission control.

BACKGROUND OF THE INVENTION

Currently, the research on resource and admission control is a hot topic of international standardization organizations. The International Telecommunication Union—Telecommunication Standardization Sector (ITU-T), Telecommunications and Internet Converged Services and Protocols for Advanced Networking (TISPAN), and the 3rd Generation Partnership Project (3GPP) have researched it to different extents.

Different organizations call the term "resource and admission control" differently, and the functional architecture and the research scope also differ to some extent, as detailed below:

The concept of resource and admission control is initially put forward in the TISPAN. The relevant function is called "Resource and Admission Control Subsystem (RACS)". FIG. 1 shows a RACS architecture. The RACS correlates the resource requirement at the service layer (IP Multimedia Subsystem (IMS)) with the resource allocation of the network transmission layer, and is responsible for policy control, resource reservation, admission control, Network Address Translation (NAT), and firewall traversal.

The Service Policy Decision Function (SPDF) southbound interface in the RACS architecture is responsible for NAT traversal control and access control, transport protocol selection policy, bandwidth control, Quality of Service (QoS) marking, consumption measurement and statistic report, and resource state synchronization. The southbound interface mentioned herein is a logical interface between the policy decision unit/device and the bearer and transmission unit/device.

The function related to resource and admission control in the ITU-T is a Resource and Admission Control Function (RACF). FIG. 2 shows a RACF architecture, where the Policy Decision Function Entity (PD-FE) southbound interface is responsible for resource reservation and designation, QoS processing (such as packet marking and policy application), access control, NAT and address mapping, resource consumption information report, and dynamic firewall mode selection.

The function related to resource and admission control in the 3GPP is Policy Control and Charging (PCC). FIG. 3 shows the PCC architecture, where the Policy Control and Charging Rules Function (PCRF) southbound interface is responsible for initiation and maintenance of IP Connectivity Access Network (IP-CAN) session connections, PCC decision request and provision, negotiation of an IP-CAN bearer setup mode, and termination of IP-CAN connections.

According to the initial design, the RACS architecture of the TISPAN is oriented to fixed networks; the PCC architecture of the 3GPP is oriented to mobile networks; and the RACF architecture of the ITU-T is oriented to both fixed and mobile networks.

The initial assumptions of the network architecture for resource control and admission control differ between the standardization organizations such as the ITU-T, TISPAN, and 3GPP, and therefore, the development of the standard technologies is not synchronous or consistent between the organizations. With the emergence and the development of the ALL-IP technology and the Fixed-Mobile Combination (FMC) technology, network operators and equipment manufacturers take the initiative in converging the network architecture under different standards with respect to the components and interfaces that share common features, with a view to unifying the relevant network elements and interfaces gradually, simplifying the network and reducing the cost of network construction.

FIG. 4 and FIG. 5 show most interfaces in the foregoing architectures. Currently, the combination of the southbound interfaces Gx, Re and Ia is proposed in the industry. In FIG. 5, the double arrowhead indicates the interfaces that need to be converged. Besides, for combination of such interfaces, combination of these bearer and transmission devices is also required: Policy and Charging Enforcement Function (RCEF), Core Border Gateway Function (C-BGF), Gateway (GW), Gateway GPRS Support Node (GGSN), IMS Access GW, and Broadband Access Server (BRAS).

In the process of implementing the present invention, the inventor finds at least the following difficulties in achieving such combination:

1. It is difficult for the existing standard systems to compromise with each other to implement the uniform southbound interface.

2. It is technically difficult to implement uniform southbound interfaces and relevant processes even if different standard systems can compromise with each other.

3. The existing network devices should be changed massively to support uniform interfaces after combination, and the high cost makes the combination impracticable.

SUMMARY OF THE INVENTION

Embodiments of the present invention provide a method, device, and system for combination of resource and admission control to achieve combination of devices and systems under different standards.

The embodiments of the present invention are fulfilled through the following technical solution:

A device for combination of police decision is provided in an embodiment of the present invention. The device includes:

a database, adapted to record information about the correspondence between the type of an interacting bearer and transmission device and the working protocol of an interface; and a policy decision unit, adapted to: obtain the type of the bearer and transmission device according to information about a user equipment that sends QoS or an authentication request, search the database according to the type of the bearer and transmission device, select the working protocol of the interface corresponding to the type of the bearer and transmission device, and control policy decision.

A bearer and transmission combination device is provided in an embodiment of the present invention to converge functions and interfaces of two or more bearer and transmission devices in different standard systems. The bearer and transmission combination device includes:

a user equipment type data table, adapted to store a type of a user equipment corresponding to information about the user equipment; and a policy enforcement and bearer and transmission unit, adapted to enforce specific policies, carry or transport data, and bind the working mode of an interface corresponding to the type of the user equipment.

A system for combination of resource and admission control is provided in an embodiment of the present invention. The system includes:

a device for combination of police decision, adapted to: converge functions and interfaces of two or more policy decision devices in different standard systems, obtain and store the correspondence between the type of a user equipment and the working protocol of an interface, and select the corresponding working protocol of the interface according to the type of the user equipment;

a bearer and transmission combination device, adapted to combine functions and interfaces of two or more bearer and transmission devices in different standard systems, and interact with the device for combination of police decision through the working protocol of the interface selected by the device for combination of police decision.

A method of combination resource and admission control is provided in an embodiment of the present invention. The method includes:

by a device for combination of police decision that converges functions and interfaces of two or more policy decision devices in different standard systems, obtaining the type of a user or terminal equipment;

selecting the corresponding working protocol of an interface according to the type of the user or terminal equipment;

notifying the working protocol of the interface and/or the type of the user or terminal equipment to a corresponding bearer and transmission combination device which converges functions and interfaces of two or more bearer and transmission devices in different standard systems; and controlling policy decision for the bearer and transmission combination device according to the selected working protocol of the interface.

As seen from the foregoing technical solution, in the embodiments of the present invention, a device for combination of police decision is set to enable combination of policy decision devices, and therefore, few changes are made to the existing network; when multiple bearer and transmission devices exist in a management domain, fewer policy decision devices are required, and the costs of network construction, operation and maintenance are reduced. Moreover, the technical solution facilitates coordination and combination between different standards, and expedites the industrialization.

DETAILED DESCRIPTION OF THE INVENTION

The technical solution under the present invention is expounded below with reference to accompanying drawings. Evidently, the embodiments herein are exemplary only, and are not all of the embodiments of the present invention. Those skilled in the art can derive other embodiments from the embodiments without creative work, and all such embodiments are covered in the scope of protection of the present invention.

In the embodiments of the present invention, a device for combination of police decision is set. This device converges the functions and interfaces of the policy decision devices in different standard systems, and interacts with bearer and transmission devices in different standard systems. According to the type of a bearer and transmission device, the interaction mode supported by the bearer and transmission device is selected for interactions; that is, a specific interface message is selected.

Figure 1:
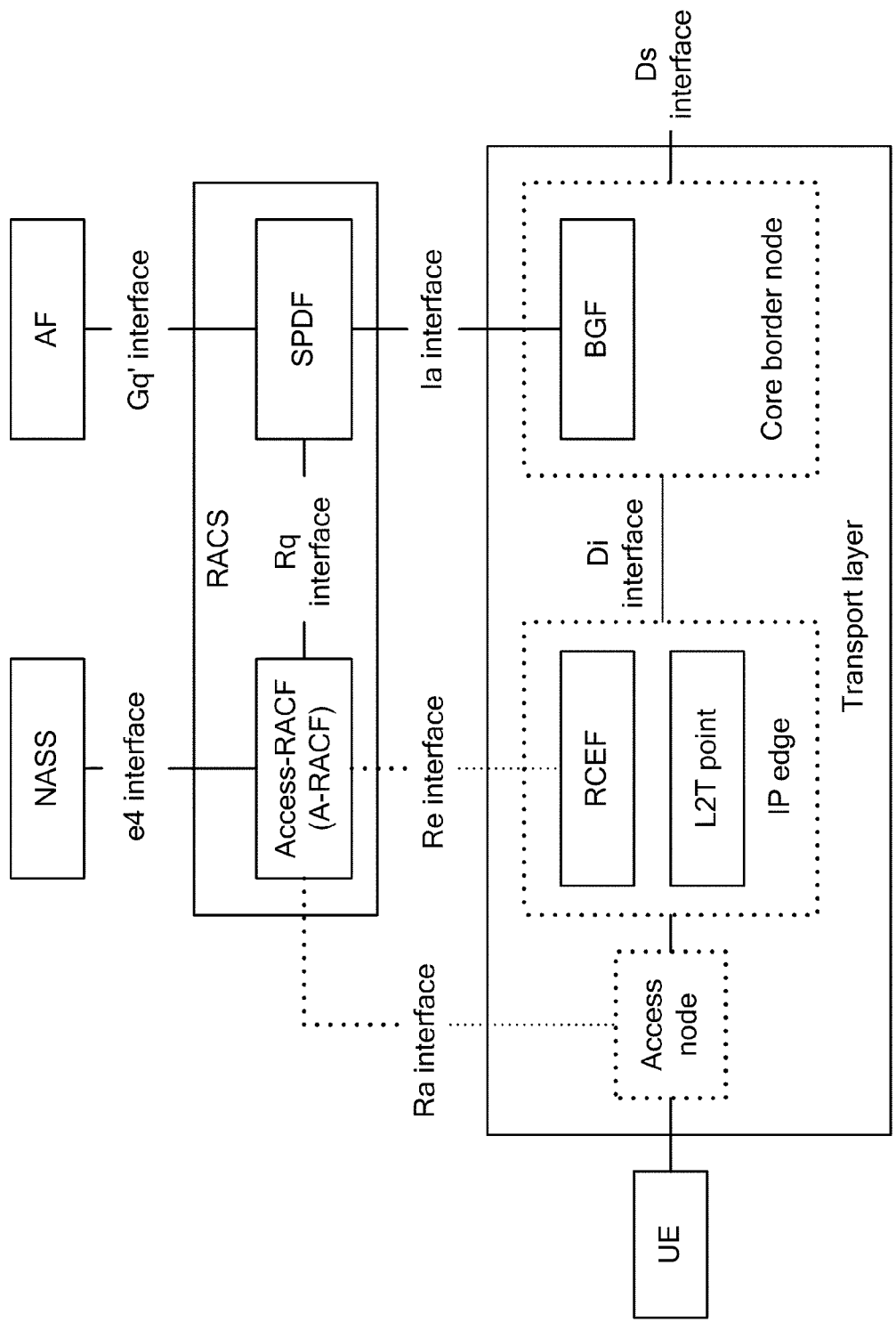
FIG. 1 shows a RACS architecture in the prior art.
Figure 2:
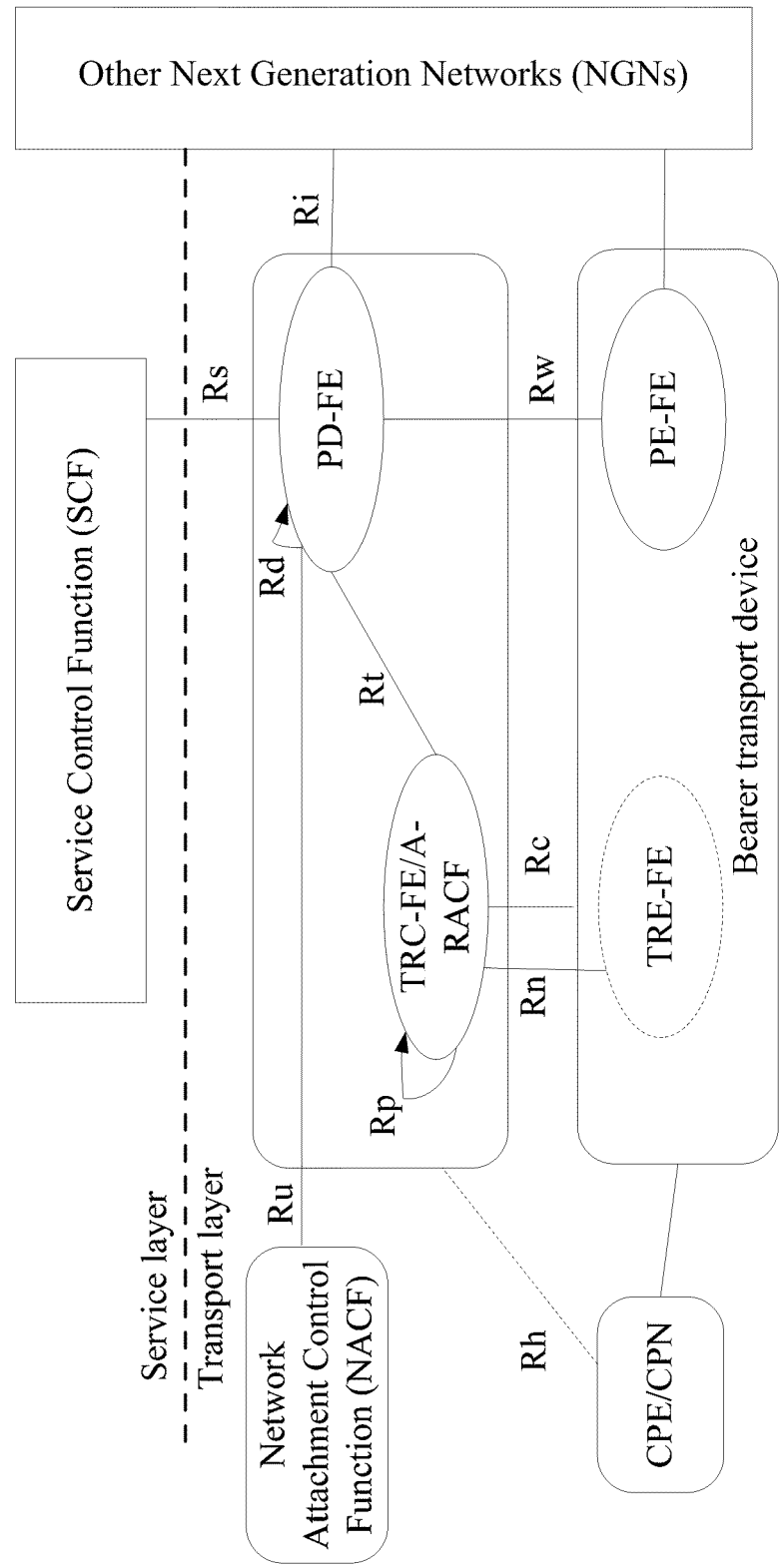
FIG. 2 shows a RACF architecture in the prior art.
Figure 3:
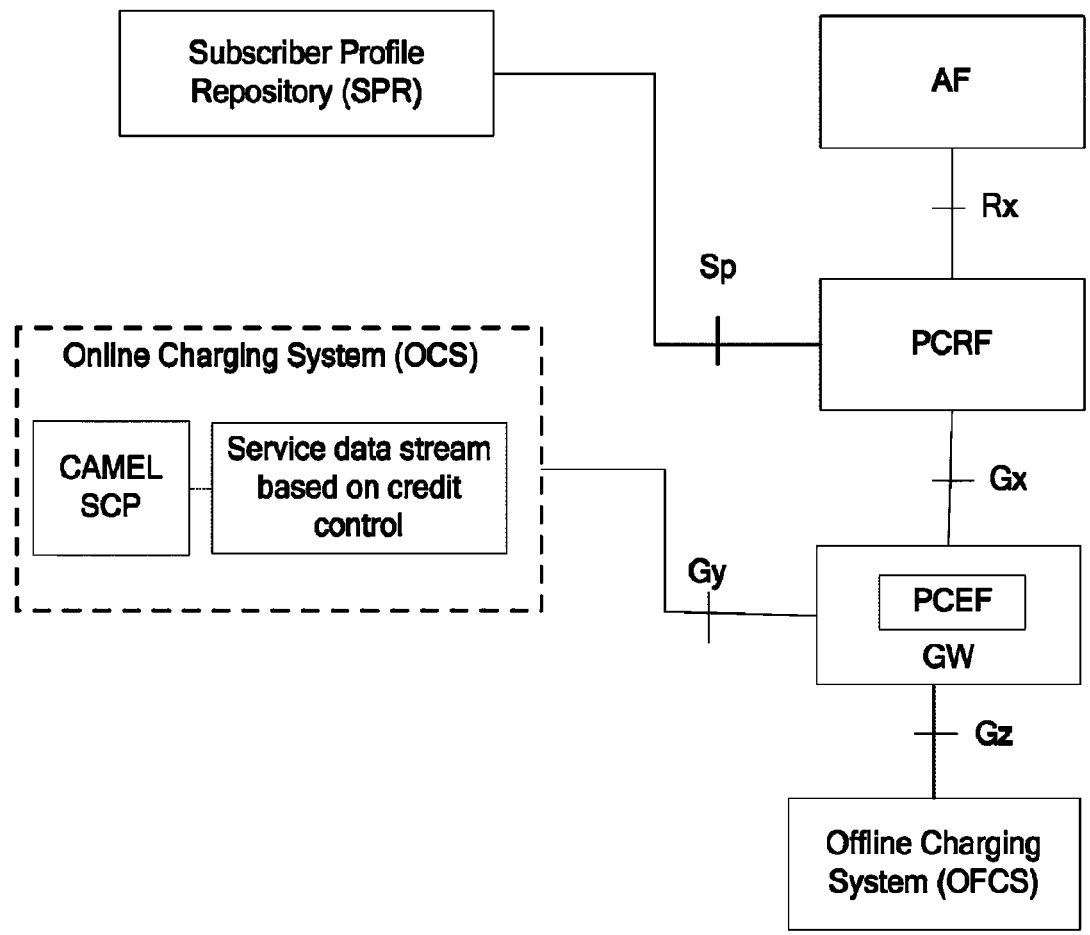
FIG. 3 shows a PCC architecture in the prior art.
Figure 4:
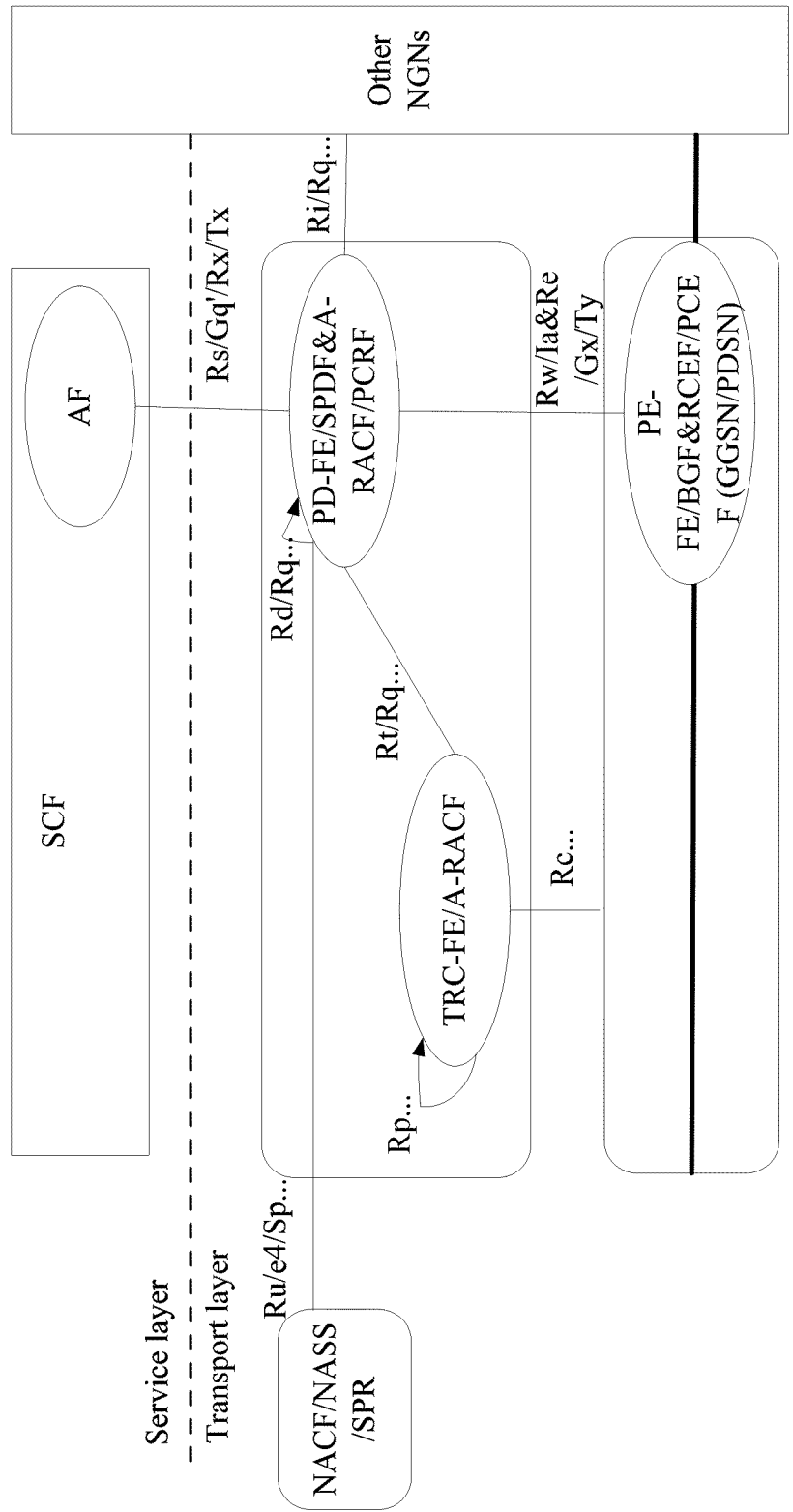
FIG. 4 and FIG. 5 illustrate most interfaces of the architectures shown in FIG. 1, FIG. 2 and FIG. 3 in the prior art.
Figure 5:
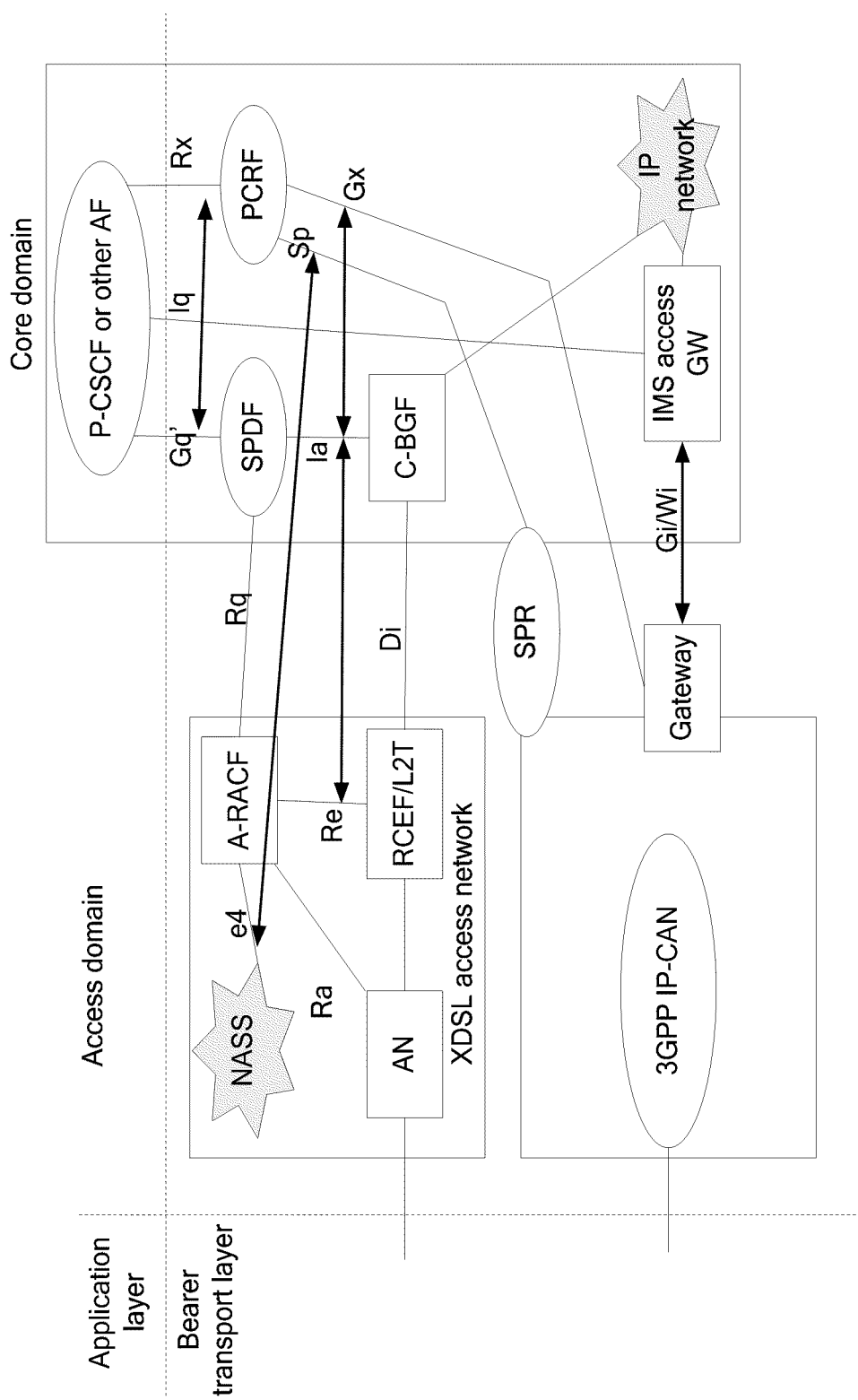
Figure 6:
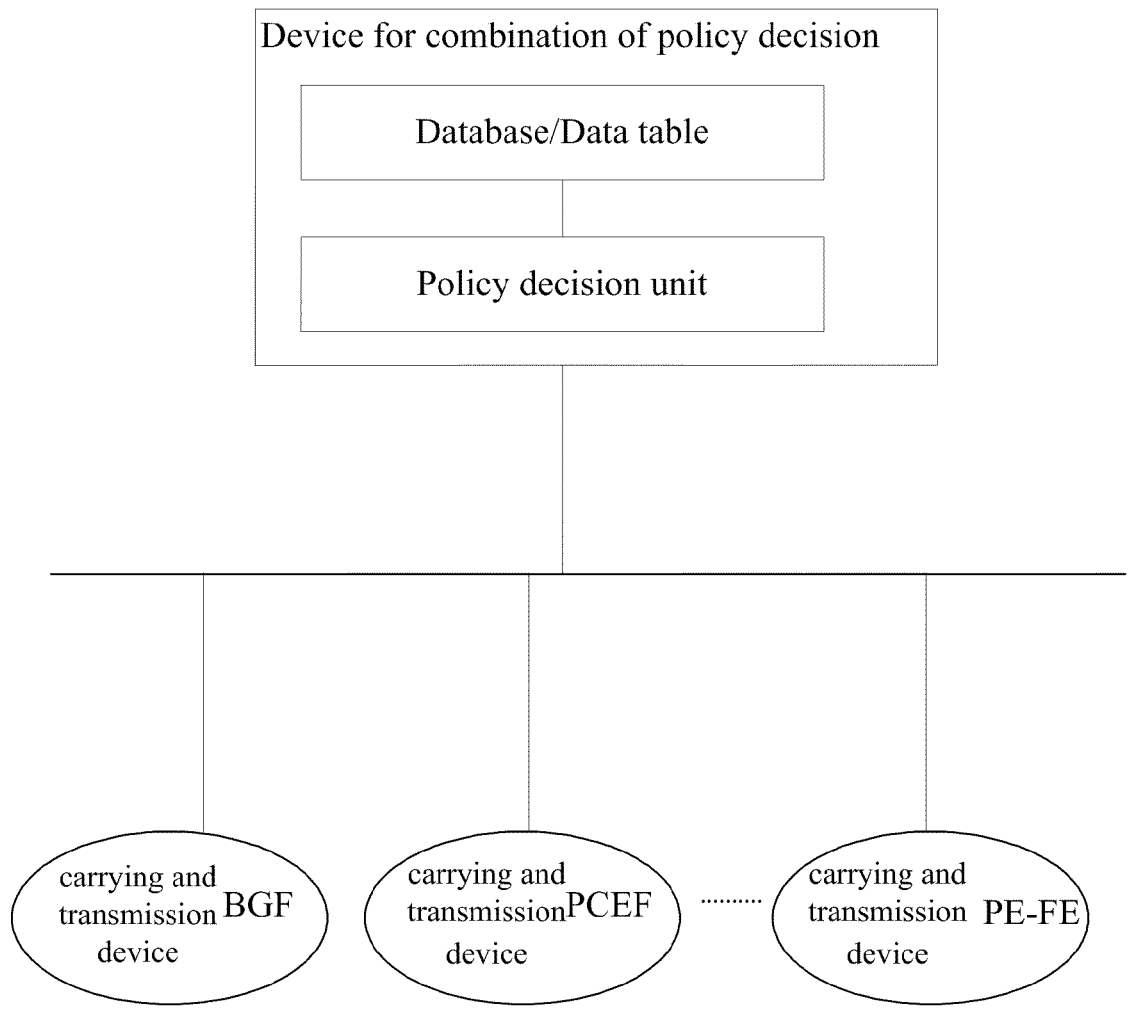
FIG. 6 shows a system architecture in a first embodiment of the present invention.

As shown in FIG. 6, a resource and admission control combination system is provided in the first embodiment of the present invention. The system includes a device for combination of police decision.

The device for combination of police decision can converge the functions and the interfaces of two or more types of policy decision devices in the ITU-T, TISPAN, and 3GPP standard systems, for example, SPDF, PCRF, and PD-FE. The device for combination of police decision is connected to the bearer and transmission devices in different standard systems through different southbound interfaces, and can obtain and store the correspondence between the type of a bearer and transmission device and a southbound interface, determine the type (namely, working mode) of the bearer and transmission device according to the information about the user or terminal equipment that sends the QoS or authentication request, and select the corresponding working protocol of the southbound interface according to the determined type of the bearer and transmission device. To implement the functions, the device for combination of police decision includes at least:

a database or data table, adapted to record the information about the correspondence between the type of the interacting bearer and transmission device and the working protocol of the southbound interface; and a policy decision unit, which supports the working protocol of the southbound interface in multiple standard systems and is adapted to: obtain the type of the bearer and transmission device according to the information about the user or terminal equipment that sends the QoS or authentication request, search the database or data table according to the obtained type of the bearer and transmission device, and determine the specific working protocol of the southbound interface, namely, select the working protocol of the southbound interface corresponding to the type of the bearer and transmission device, and control policy decision.

The device for combination of police decision may further include:

a bearer and transmission device type determining unit (not illustrated in the figure), adapted to obtain the type of the bearer and transmission device corresponding to the user or terminal equipment according to the information about the user or terminal equipment (for example, access information, or the ID of the user or terminal equipment); and a unit for obtaining the correspondence between a bearer and transmission device type and a southbound interface protocol (not illustrated in the figure), adapted to: obtain the corresponding working protocol of the southbound interface according to the type of the bearer and transmission device in the case that the database or data table includes no correspondence between the type of the bearer and transmission device and the working protocol of the southbound interface, and record the corresponding working protocol of the southbound interface into the database or data table.

The system further includes multiple bearer and transmission devices which may be multiple bearer and transmission devices in different standard systems, for example, the PE-FE in the ITU-T standard, Border Gateway Function (BGF) in the TISPAN standard, and/or PCEF in the 3GPP standard.

In this embodiment, a device for combination of police decision is set to converge the policy decision devices in different standards. Therefore, the device for combination of police decision can interact with the existing bearer and transmission devices of different existing networks. The working mode of the bearer and transmission devices remains unchanged, thus reducing the combination cost and improving the utilization of the existing network devices. Moreover, the work of coordination between different standardization organizations is reduced, and the standardization progress is impelled.

Figure 7:
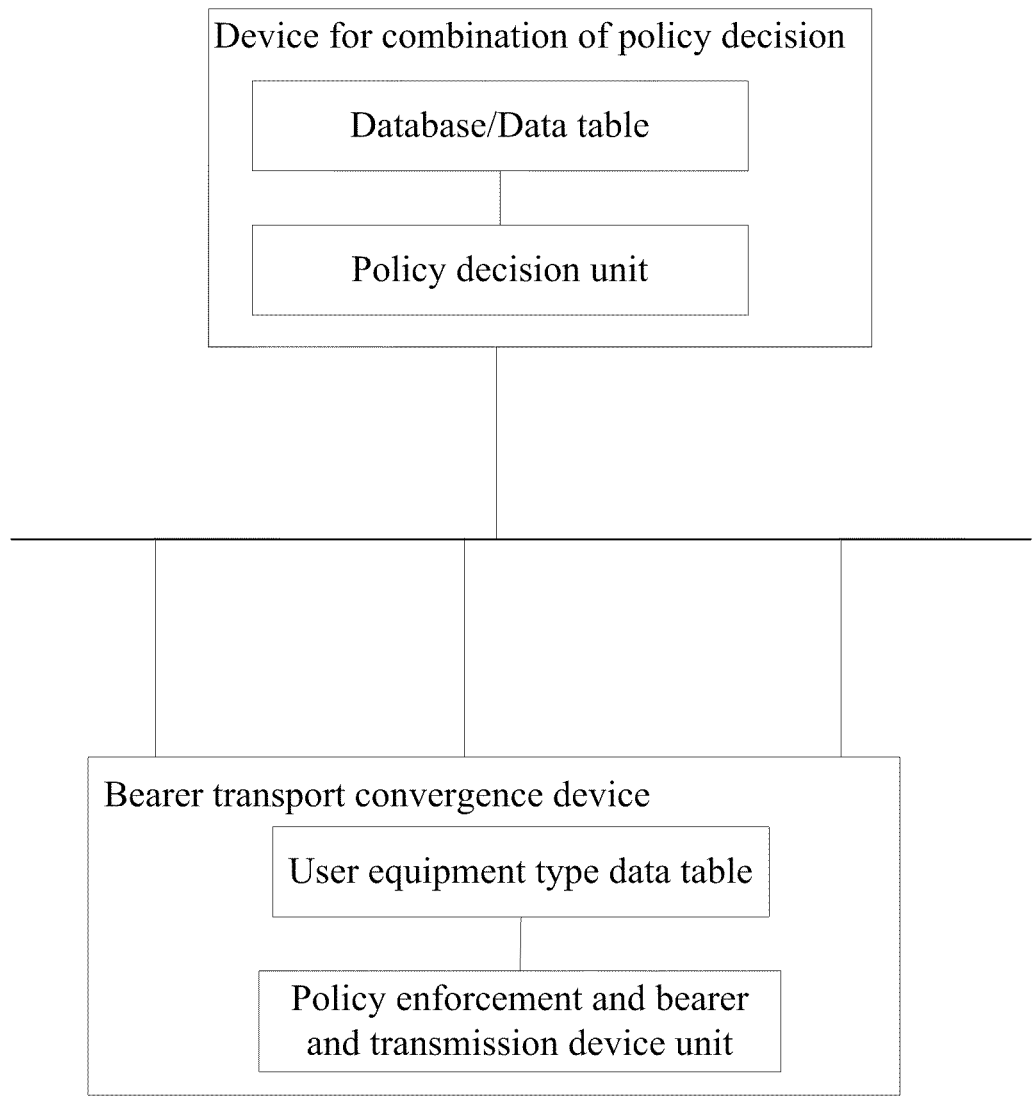
FIG. 7 shows a system architecture in a second embodiment of the present invention.

As shown in FIG. 7, a resource and admission control combination system is provided in the second embodiment of the present invention. The system includes:

a device for combination of police decision, adapted to: converge the functions and interfaces of two or more policy decision devices (such as SPDF, PCRF, and PD-FE) in different standard systems such as the ITU-T, TISPAN, and 3GPP, obtain and store the correspondence between the type of the user or terminal equipment and the working protocol of the southbound interface through the connection between multiple southbound interfaces and the bearer and transmission combination device, and select the corresponding working protocol of the southbound interface according to the type of the user or terminal equipment. To implement the functions, the device for combination of police decision includes at least:

a database or data table, adapted to record the information about the correspondence between the type of the interacting user or terminal equipment and the working protocol of the southbound interface; and a policy decision unit, which supports the working protocol of the southbound interface in multiple standard systems and is adapted to: select the working protocol of the southbound interface that matches the type of the user or terminal equipment to control policy decision according to the type of the interacting user or terminal equipment and the information in the database or data table.

The device for combination of police decision may further include:

a user device type information obtaining unit (not illustrated in the figure), adapted to obtain the information about the type of the user or terminal equipment; and a bearer and transmission combination device, adapted to: converge the functions and interfaces of two or more bearer and transmission devices (such as PE-FE in the ITU-T standard, BGF in the TISPAN standard, and/or PCEF in the 3GPP standard) in the standard systems such as the ITU-T, TISPAN, and 3GPP, interact with the device for combination of police decision through the working protocol of the southbound interface that is selected by the device for combination of police decision and matches the type of the user or terminal equipment, and interact with multiple types of users or terminal equipments.

The bearer and transmission combination device may include:

a user or terminal equipment type data table, adapted to store the type of the user or terminal equipment corresponding to the information about the user or terminal equipment; and a policy enforcement and bearer and transmission unit, adapted to: enforce specific policies, bear or transport data, and bind the working mode of the southbound interface corresponding to the type of the user or terminal equipment.

This embodiment converges the policy decision devices and the bearer and transmission devices, reduces the work of coordination between different standard systems, and expedites the industrialization.

Figure 8:
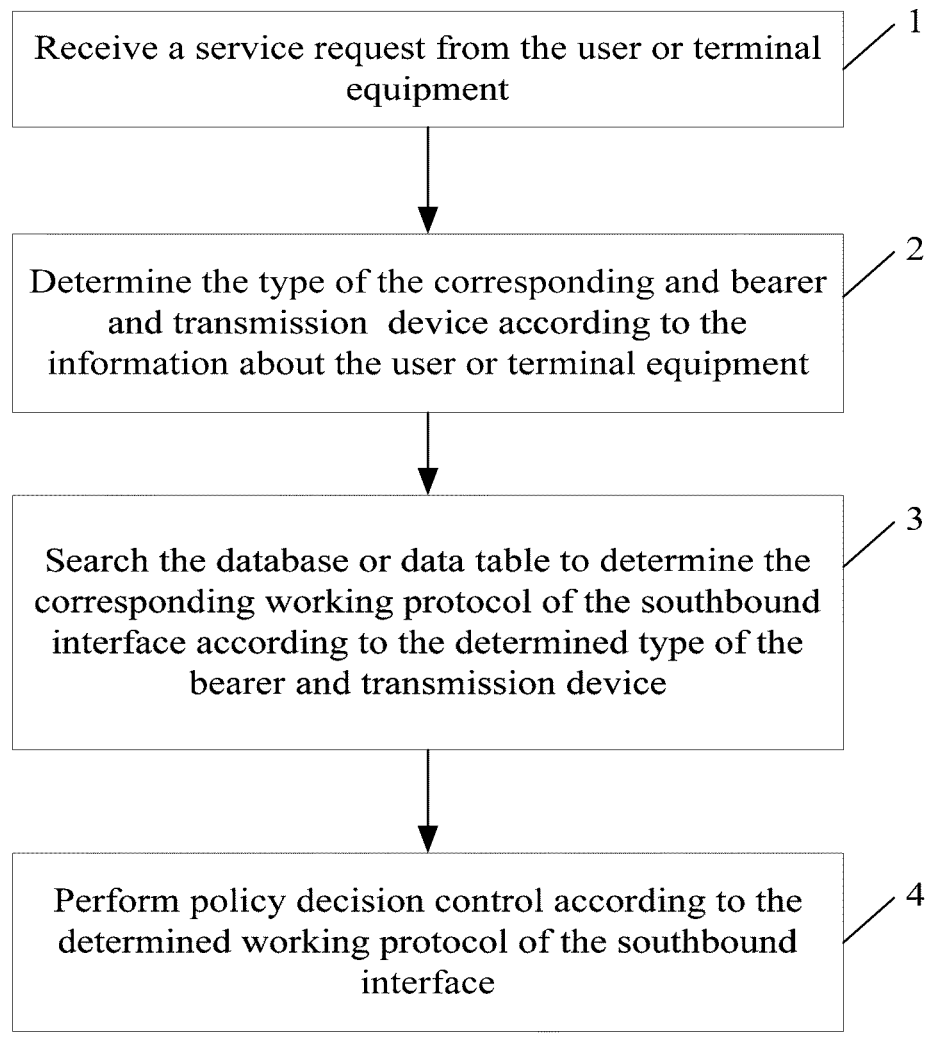
FIG. 8 is a method flowchart in a third embodiment of the present invention.

As shown in FIG. 8, a resource and admission control combination method is provided in the third embodiment of the present invention. The method includes the following steps:

Step 1: Receive the QoS or authentication request from the user or terminal equipment.

Step 2: Determine the type of the corresponding bearer and transmission device according to the information about the user or terminal equipment.

The existing policy decision devices can determine the type of the bearer and transmission device according to the information about the user or terminal equipment, for example, access information, and the ID of the user or terminal equipment. Therefore, the device for combination of police decision mentioned in this embodiment converges the functions of the existing policy decision devices, and can determine the type of the corresponding bearer and transmission device according to the information about the user or terminal equipment.

Step 3: Search the database or data table to determine the corresponding working protocol of the southbound interface according to the determined type of the bearer and transmission device; or obtain the correspondence between the type of the bearer and transmission device and the working protocol of the southbound interface in the case that the database or data table does not include the correspondence.

Figure 9:
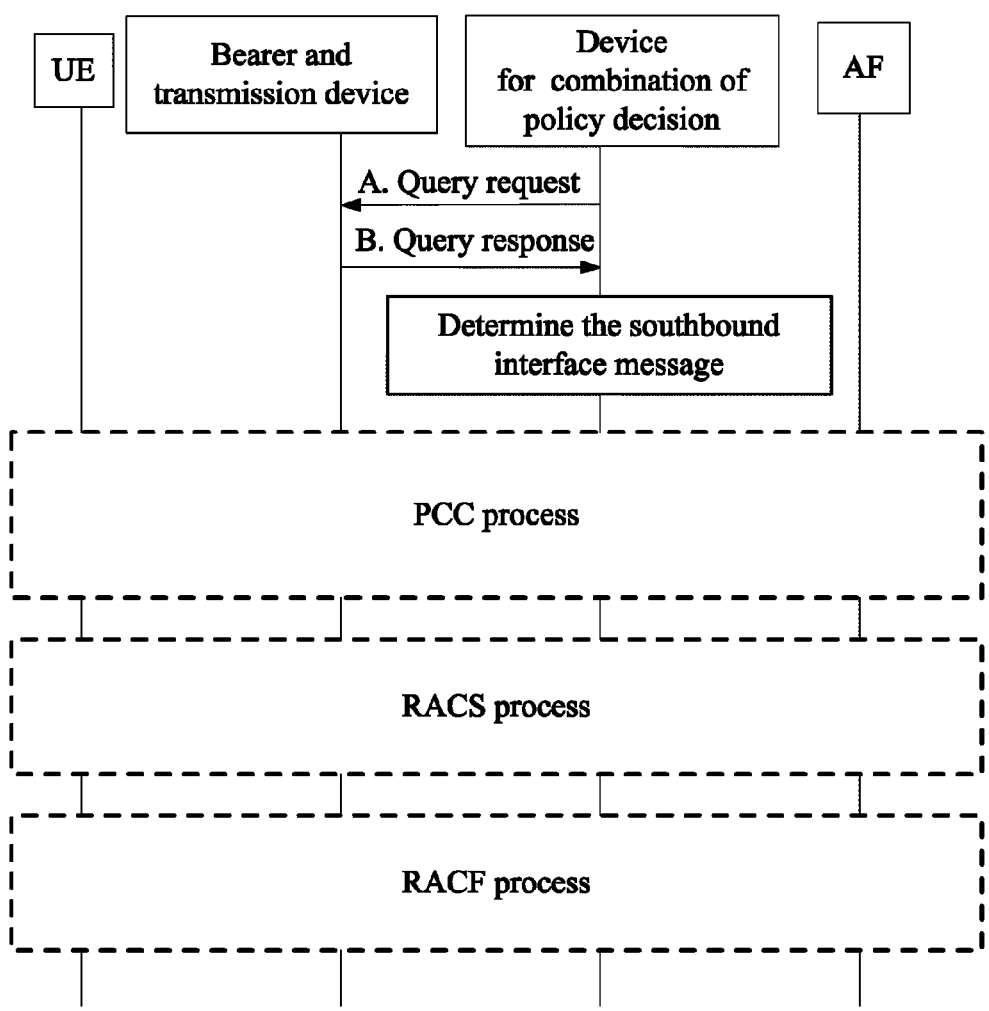
FIG. 9 shows a first instance of obtaining the type of a bearer and transmission device in the third embodiment of the present invention.
Figure 10:
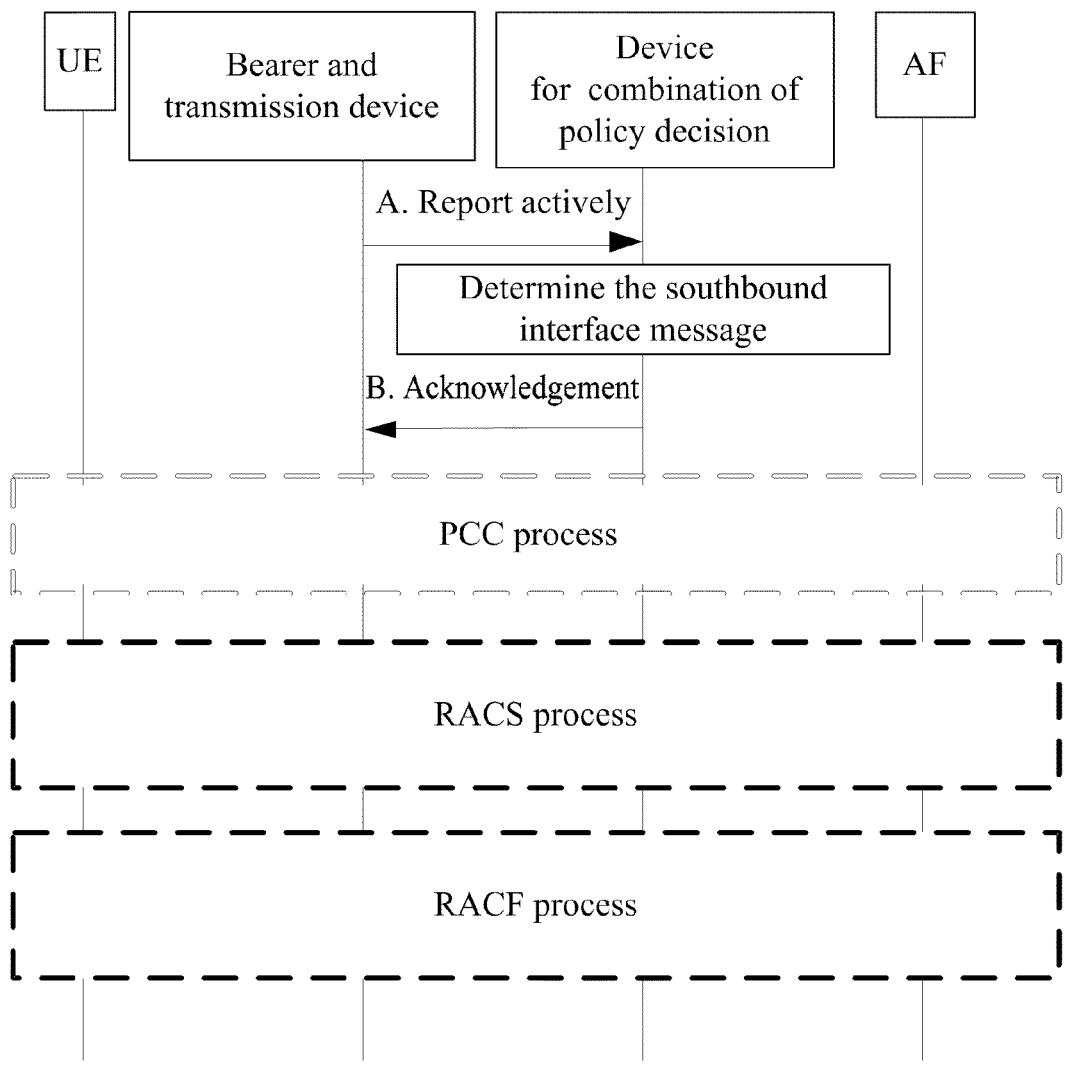
FIG. 10 shows a second instance of obtaining the type of a bearer and transmission device in the third embodiment of the present invention.
Figure 11:
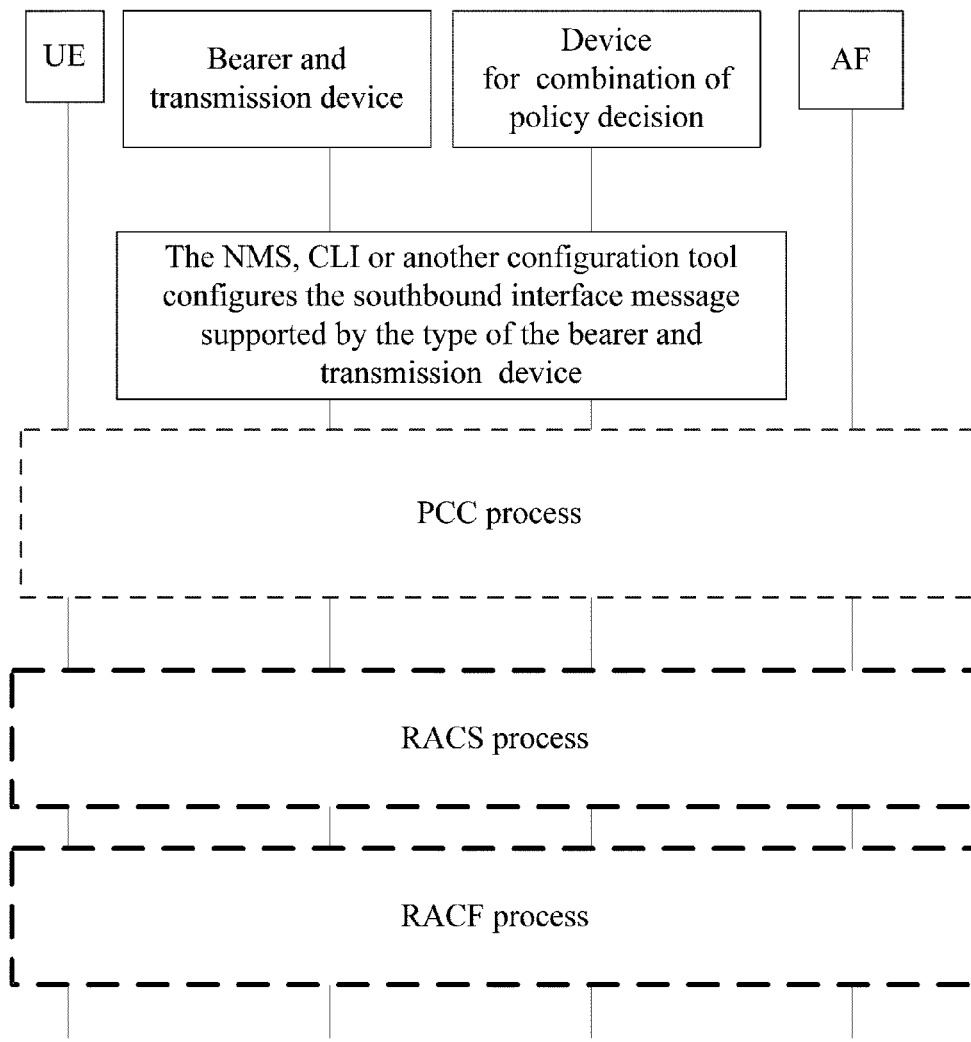
FIG. 11 shows a third instance of obtaining the type of a bearer and transmission device in the third embodiment of the present invention.

The method for obtaining the correspondence between the type of the bearer and transmission device and the working protocol of the southbound interface includes:

(1) As shown in FIG. 9, a query request is sent to the corresponding bearer and transmission device. The bearer and transmission device responds to the query request, and feeds back the working protocol of the southbound interface supported by the bearer and transmission device type to the device for combination of police decision; or (2) As shown in FIG. 10, the bearer and transmission device reports the working protocol of the southbound interface supported by the device type to the device for combination of police decision; or (3) As shown in FIG. 11, the network management system, the command line interface or another configuration tool makes the configuration.

The obtained correspondence between the type of the bearer and transmission device and the working protocol of the southbound interface is recorded into the database or data table.

Step 4: Control the policy decision according to the determined working protocol of the southbound interface, namely, select the working mode corresponding to the bearer and transmission device.

For different types of bearer and transmission devices, the device for combination of police decision may set the corresponding working mode, and the subsequent interaction is performed according to the set working mode. The processes that already exist in the architectures such as RACF, RACS and PCC of the bearer and transmission device remain unchanged. FIG. 9, FIG. 10 and FIG. 11 show the details about how the device for combination of police decision uses a PCC process to communicate with the bearer and transmission device when the bearer and transmission device is determined to be in PCC mode. The communication process is based on the prior art, and is not described herein further.

Figure 12:
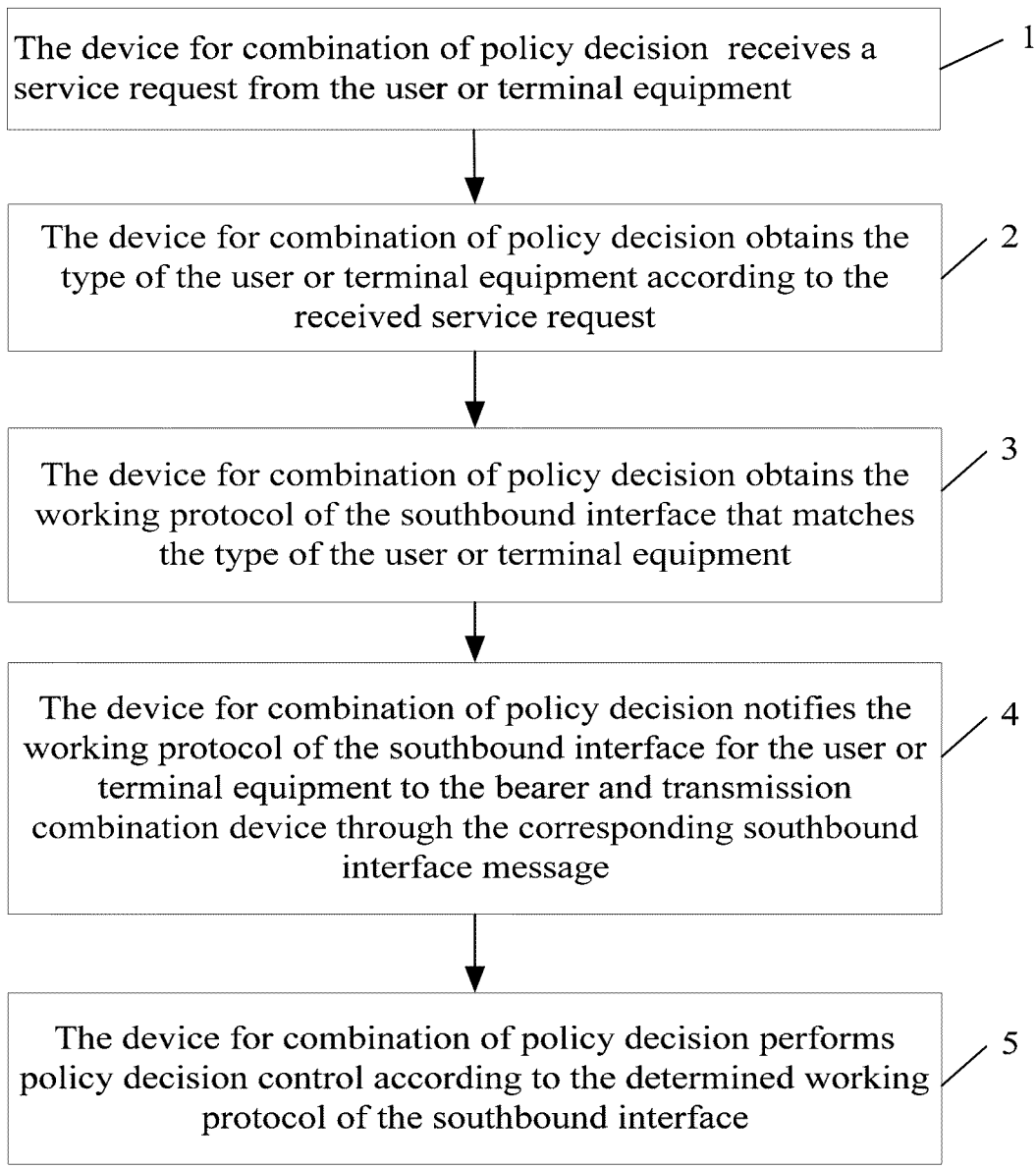
FIG. 12 is a flowchart of a fourth embodiment of the present invention.

As shown in FIG. 12, a resource and admission control combination method is provided in the fourth embodiment of the present invention. The method includes the following steps:

Step 1: The device for combination of police decision receives the QoS or authentication request from the user or terminal equipment.

Step 2: The device for combination of police decision obtains the type of the user or terminal equipment according to the received QoS or authentication request.

The device for combination of police decision obtains the type of the user or terminal equipment in the following way:

(1) If the bearer and transmission combination device is unable to determine the type of the user or terminal equipment, the user or terminal equipment adds the type of the user or terminal equipment to the service request, and the Application Function (AF) entity notifies the type information to the device for combination of police decision when sending a QoS request or authentication request; or (2) If the bearer and transmission combination device is unable to determine the type of the user or terminal equipment, in the process of attaching to the network when the user or terminal equipment accesses the network, the network attachment subsystem obtains the type of the user or terminal equipment, and the device for combination of police decision may query the network attachment subsystem to obtain the type of the user or terminal equipment; or (3) If the bearer and transmission combination device is able to determine the type of the user or terminal equipment, the bearer and transmission combination device sends a query request to the bearer and transmission combination device. The request carries the information about the user or terminal equipment (including access information, and/or the ID of the user or terminal equipment). Afterward, the bearer and transmission combination device determines the type of the user or terminal equipment and the working mode corresponding to this type of the user or terminal equipment according to the information about the user or terminal equipment, and feeds back the determined type of user or terminal equipment to the device for combination of police decision; or (4) The bearer and transmission combination device reports the type of the user or terminal equipment to the device for combination of police decision; or (5) In the authentication process, the bearer and transmission combination device may report the information about the user or terminal equipment to the device for combination of police decision through a QoS request or an authentication request of the user. The device for combination of police decision identifies the type of the user or terminal equipment, sets the working protocol of the southbound interface for this type, and notifies the working protocol of the southbound interface to the bearer and transmission combination device through an authentication acknowledgement.

Step 3: The device for combination of police decision matches the type of the user or terminal equipment with the working protocol of the southbound interface.

The device for combination of police decision may search the database or data table for the working protocol of the southbound interface corresponding to the type of the user or terminal equipment. The device for combination of police decision determines the working protocol of the southbound interface according to the type of the user or terminal equipment in the case that the database or data table includes no working protocol of the southbound interface corresponding to the type of the user or terminal equipment, and records the working protocol of the southbound interface into the database or data table.

Step 4: The device for combination of police decision notifies the working protocol of the southbound interface for the user or terminal equipment to the bearer and transmission combination device through the corresponding southbound interface.

Step 5: The device for combination of police decision controls the policy decision according to the determined working protocol of the southbound interface, namely, selects the working mode corresponding to the bearer and transmission combination device.

For different working modes of the bearer and transmission combination device, the device for combination of police decision may set the corresponding working mode, and the subsequent interaction is performed according to the working mode set by the device for combination of police decision. The processes that already exist in the architectures such as RACF, RACS and PCC of the bearer and transmission device remain unchanged.

In conclusion, the technical solution to combination in the embodiments of the present invention imposes little impact on the existing standards, and is easy to generalize; a device for combination of police decision is set to achieve combination so that few changes are made to the existing network; when multiple bearer and transmission devices exist in a management domain, fewer policy decision devices are required, and the costs of network construction, operation and maintenance are reduced. Moreover, the technical solution facilitates coordination and combination between different standards, and expedites the industrialization.

Although the invention has been described through several exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for combination of resource and admission control, comprising:
   combining functions and interfaces of two or more policy decision devices in different standard systems, the policy decision devices in different standard systems are Policy Decision Function Entity of Resource and Admission Control Function (RACF) by International Telecommunication Union—Telecommunication Standardization Sector (ITU-T) and Policy Control and Charging Rules Function of Policy Control and Charging (PCC) by 3rd Generation Partnership Project (3 GPP);

obtaining a type of a user equipment;

selecting a corresponding working protocol of an interface according to the type of the user equipment, the working protocol is selected in working protocols in RACF and PCC;

notifying the working protocol of the interface and the type of the user equipment to a corresponding bearer and transmission combination device which combines functions and interfaces of two or more bearer and transmission devices in different standard systems, the two or more bearer and transmission devices are PE-FE in the ITU-T and PCEF in the 3GPP; and controlling policy decision for the bearer and transmission combination device according to the selected working protocol of the interface.

2. The method of claim 1, further comprising: receiving a Quality of Service (QoS) or an authentication request from the user equipment.

3. The method of claim 2, wherein the method for obtaining the type of the user or terminal equipment comprises: obtaining the type from the QoS or authentication request sent by an application function entity.

4. The method of claim 2, wherein the method for obtaining the type of the user or terminal equipment comprises: querying a network attachment subsystem.

5. The method of claim 2, wherein the method for obtaining the type of the user or terminal equipment comprises: querying the bearer and transmission combination device.

6. The method of claim 2, wherein the method for obtaining the type of the user or terminal equipment comprises: receiving the type reported by the bearer and transmission combination device.

7. The method of claim 2, wherein the method for obtaining the type of the user or terminal equipment comprises: obtaining the type through the QoS or authentication request sent by the bearer and transmission combination device.

8. The method of claim 1, wherein the method for selecting the corresponding working protocol of the interface according to the type of the user equipment comprises searching a database that records a correspondence between the type of the user equipment and the working protocol of the interface to obtain the working protocol.

9. The method of claim 8, wherein if the database or data table comprises no correspondence between the type of the user equipment and the working protocol of the interface, the method further comprises determining the working protocol of the interface according to the type of the user equipment, and recording the working protocol of the interface into the database.

* * * * *